(12) United States Patent
Shimamura et al.

(10) Patent No.: US 7,501,203 B2
(45) Date of Patent: Mar. 10, 2009

(54) BATTERY FORMED OF A STACK OF SUBSTANTIALLY RECTANGULAR ELECTRODES

(75) Inventors: Osamu Shimamura, Kanagawa-ken (JP); Kyoichi Watanabe, Kanagawa-ken (JP); Hideaki Horie, Kanagawa-ken (JP); Yuuji Tanjou, Kanagawa-ken (JP); Takaaki Abe, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 147 days.

(21) Appl. No.: 10/316,084

(22) Filed: Dec. 11, 2002

(65) Prior Publication Data

US 2003/0113621 A1    Jun. 19, 2003

(30) Foreign Application Priority Data

Dec. 13, 2001    (JP) .......................... P 2001-379881

(51) Int. Cl.
*H01M 2/02*    (2006.01)
*H01M 2/30*    (2006.01)
(52) U.S. Cl. .................. 429/179; 429/161; 429/162; 429/178; 429/211; 429/233
(58) Field of Classification Search ................. 429/161, 429/162, 163, 170, 173, 179, 178, 211
See application file for complete search history.

(56) References Cited

U.S. PATENT DOCUMENTS

| | | | | |
|---|---|---|---|---|
| 3,220,888 A | * | 11/1965 | Moore et al. ................. | 429/1 |
| 3,506,902 A | * | 4/1970 | Sullivan ....................... | 320/106 |
| 3,821,029 A | * | 6/1974 | Smith .......................... | 429/160 |
| 3,856,575 A | * | 12/1974 | Hughes ....................... | 429/164 |
| 3,930,889 A | * | 1/1976 | Ruggiero et al. .............. | 429/97 |
| 3,969,143 A | * | 7/1976 | Mead et al. ................... | 429/179 |
| 5,283,137 A | * | 2/1994 | Ching .......................... | 429/175 |
| 5,532,080 A | * | 7/1996 | Mizoguchi et al. ........... | 429/164 |

(Continued)

FOREIGN PATENT DOCUMENTS

JP    03241669    10/1991

(Continued)

*Primary Examiner*—Jonathan Crepeau
*Assistant Examiner*—Robert Hodge
(74) *Attorney, Agent, or Firm*—McDermott Will & Emery LLP

(57) ABSTRACT

A battery includes a battery enclosure (3), a power-generating unit (50) accommodated in the battery enclosure (3), positive and negative terminal electrodes (1, 2). The battery enclosure (3) is composed of a laminate film compounded of metal and a polymer material, and has a rectangular shape. The power-generating unit (50) includes positive electrode collectors (5), negative electrode collectors (7) and separators (8). The positive and negative terminal electrodes (1, 2) have dimensions substantially equal to those of the positive and negative electrode collectors (5, 7), respectively. Further, the positive and negative terminal electrodes (1, 2) protrude from mutually different sides of the battery enclosure (3). The positive terminal electrode (1) is formed by protruding the positive electrode collectors (5) from the battery enclosure (3) in a state where end portions of the positive electrode collectors (5) are mutually stacked. The negative terminal electrode (2) is formed by protruding the negative electrode collectors (7) from the battery enclosure (3) in a state where end portions of the negative electrode collectors (7) are mutually stacked.

10 Claims, 15 Drawing Sheets

U.S. PATENT DOCUMENTS

| | | | |
|---|---|---|---|
| 5,587,253 A * | 12/1996 | Gozdz et al. | 429/316 |
| 5,871,861 A | 2/1999 | Hirokou et al. | |
| 6,391,490 B1 * | 5/2002 | Aoi et al. | 429/176 |
| 6,413,668 B1 * | 7/2002 | Sandberg et al. | 429/174 |
| 6,420,065 B1 * | 7/2002 | Yde-Andersen et al. | 429/94 |
| 6,461,764 B1 * | 10/2002 | Nakamura | 429/170 |
| 6,617,074 B1 * | 9/2003 | Watarai et al. | 429/231.95 |
| 6,743,535 B2 * | 6/2004 | Yoneyama | 429/1 |
| 6,897,634 B2 * | 5/2005 | Ramsden | 320/111 |
| 2002/0045096 A1 * | 4/2002 | Sandberg et al. | 429/163 |
| 2002/0146620 A1 * | 10/2002 | Connell | 429/161 |

FOREIGN PATENT DOCUMENTS

| | | | |
|---|---|---|---|
| JP | 05166500 | | 7/1993 |
| JP | 08096841 | | 4/1996 |
| JP | 2000-223108 A | | 8/2000 |
| JP | P2000-348772 A | | 12/2000 |
| JP | 2001-85016 | * | 3/2001 |
| JP | 2001-160389 A | | 6/2001 |
| JP | 2002-252036 | | 9/2002 |
| JP | 2003-288883 | | 10/2003 |
| WO | WO 01/59869 A1 | * | 2/2001 |

* cited by examiner

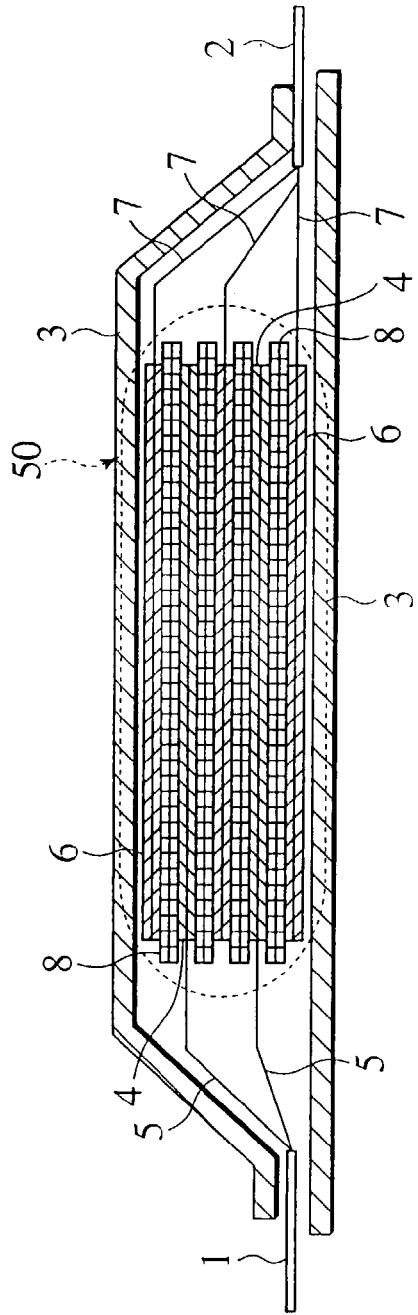
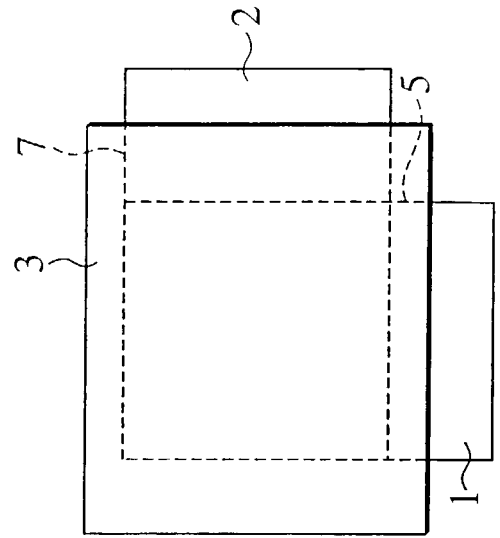
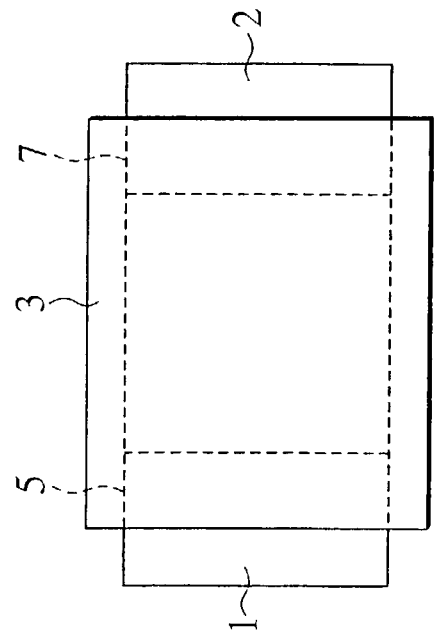
FIG.1A
FIG.1B
FIG.1C

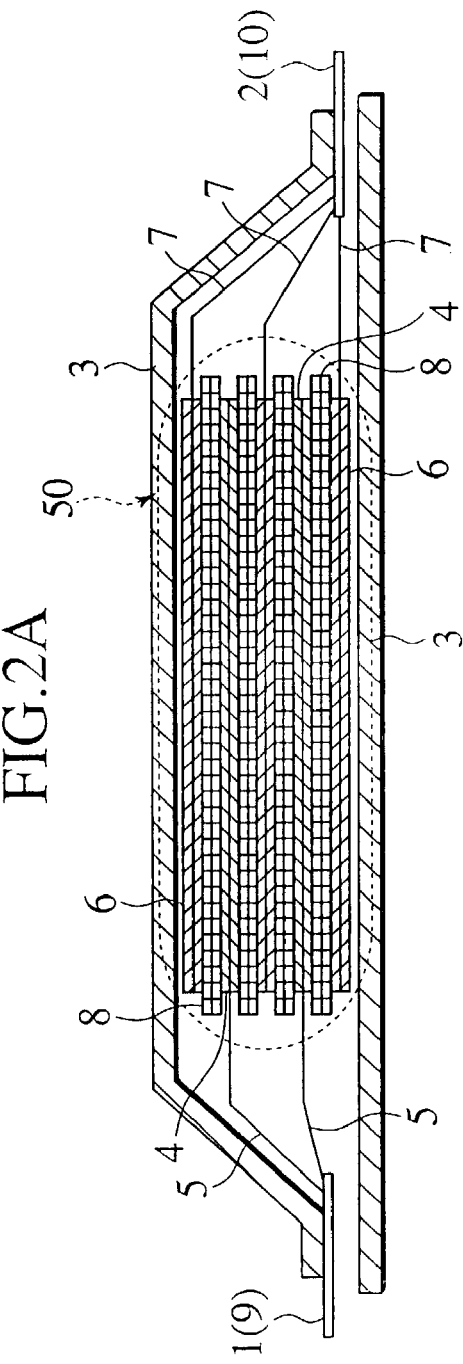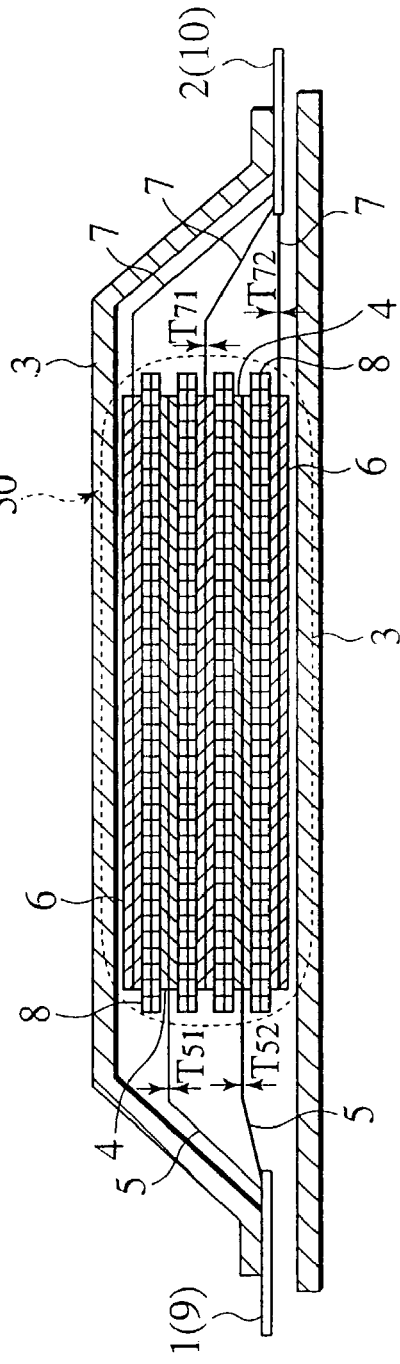

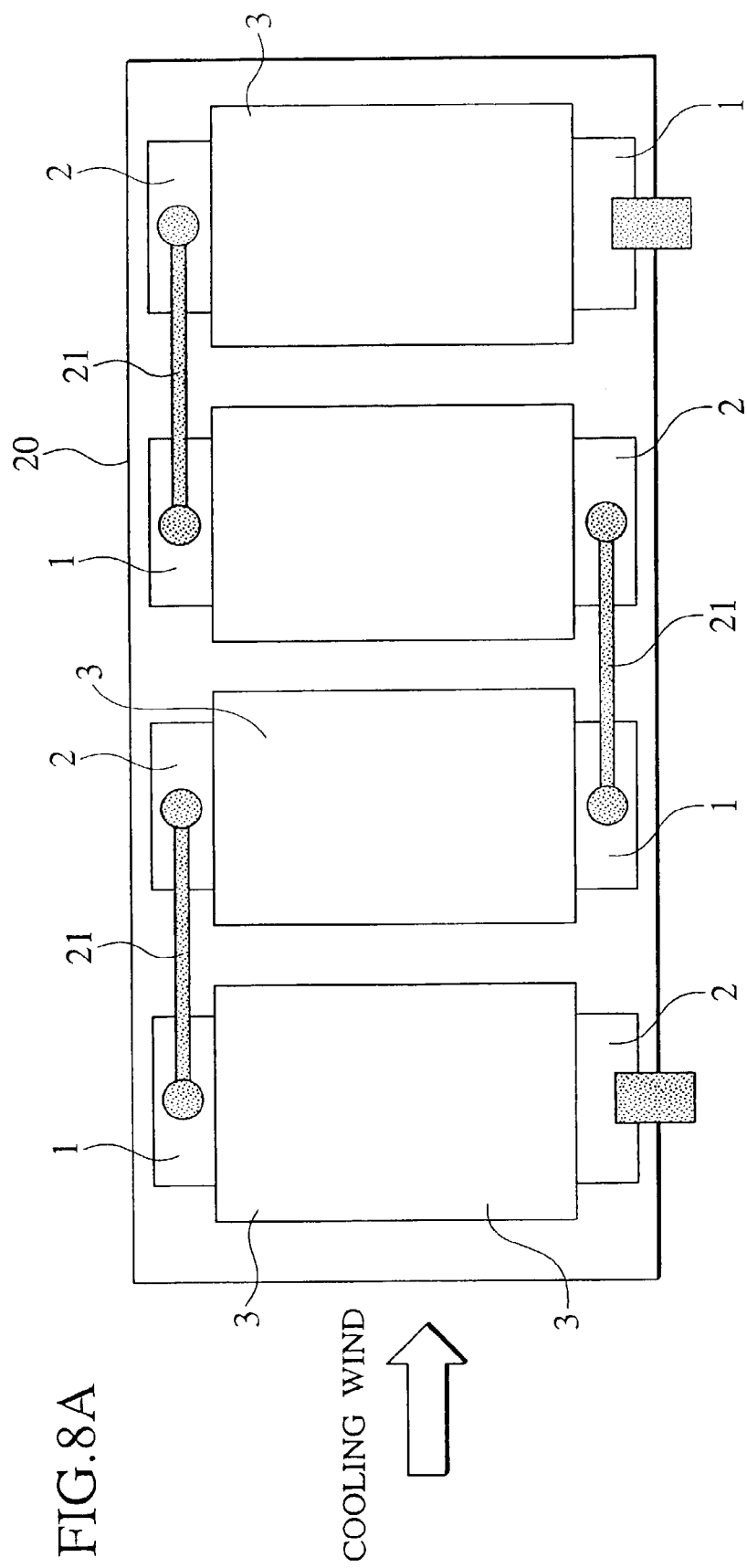
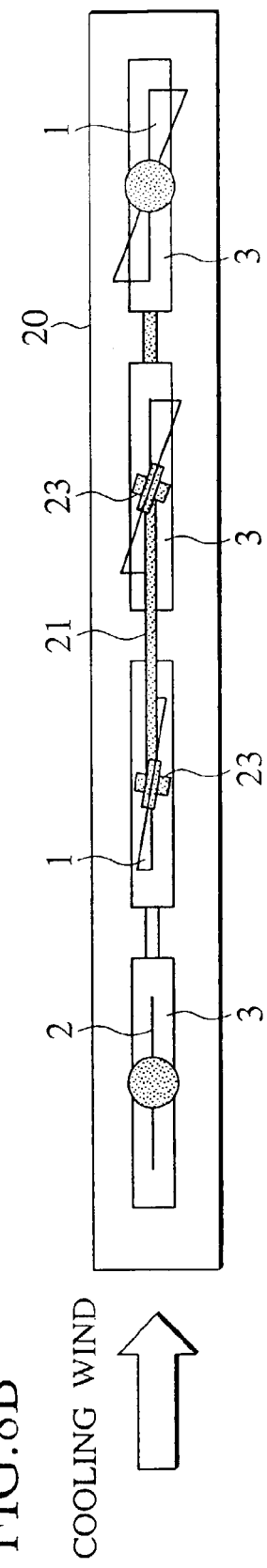
FIG.8A
FIG.8B
COOLING WIND

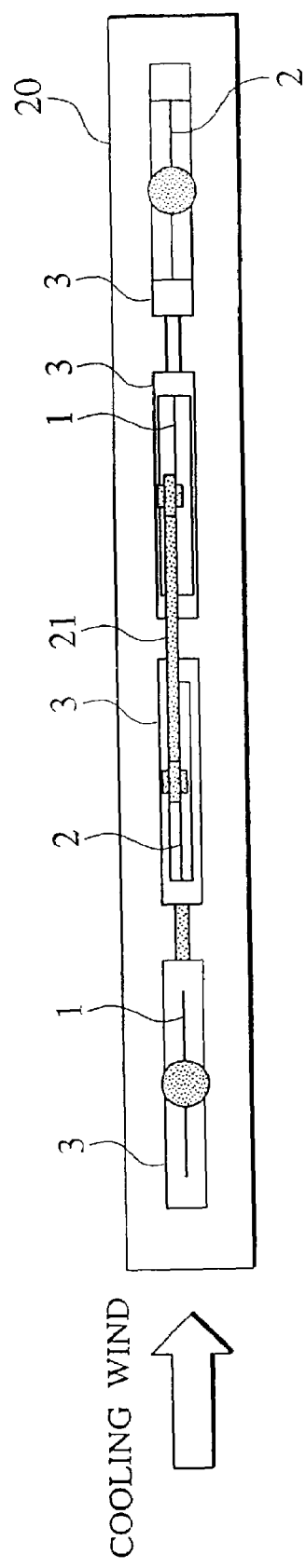
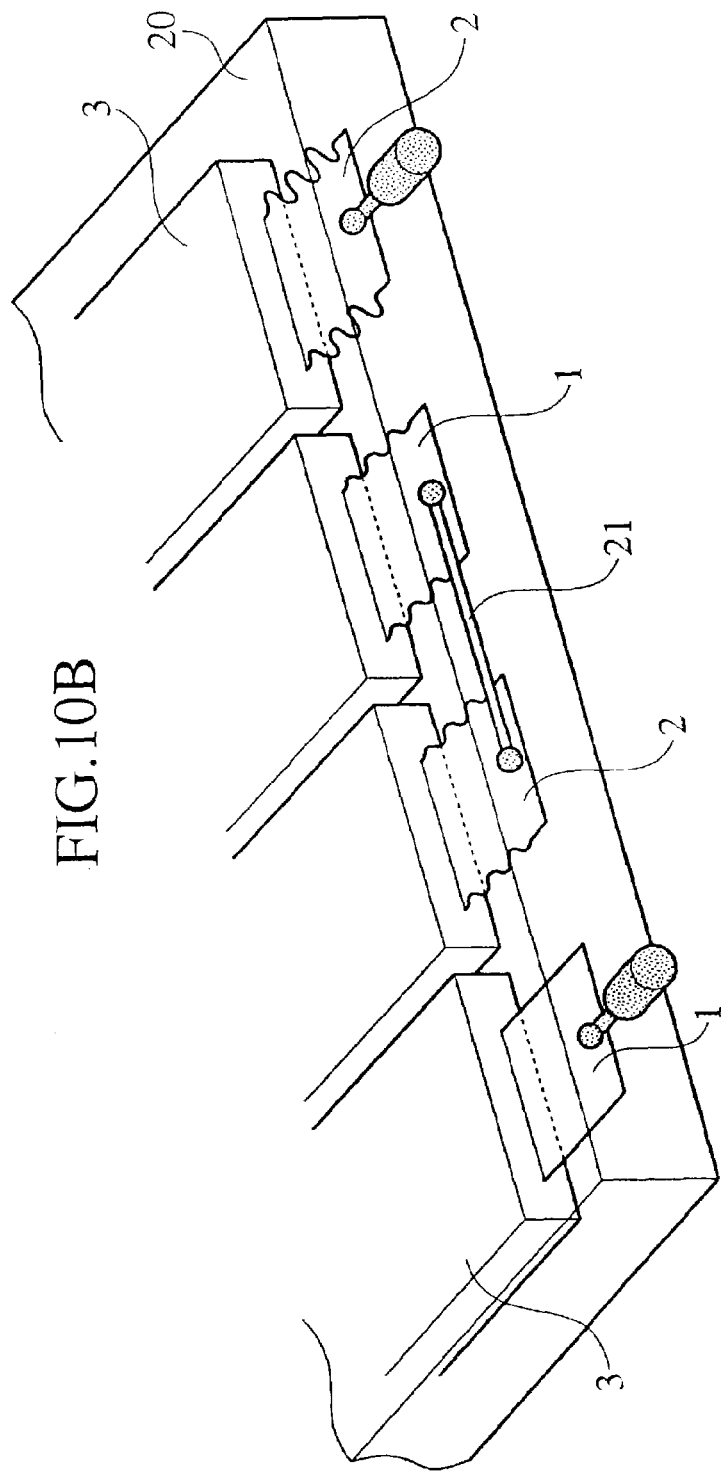
FIG.10A
FIG.10B

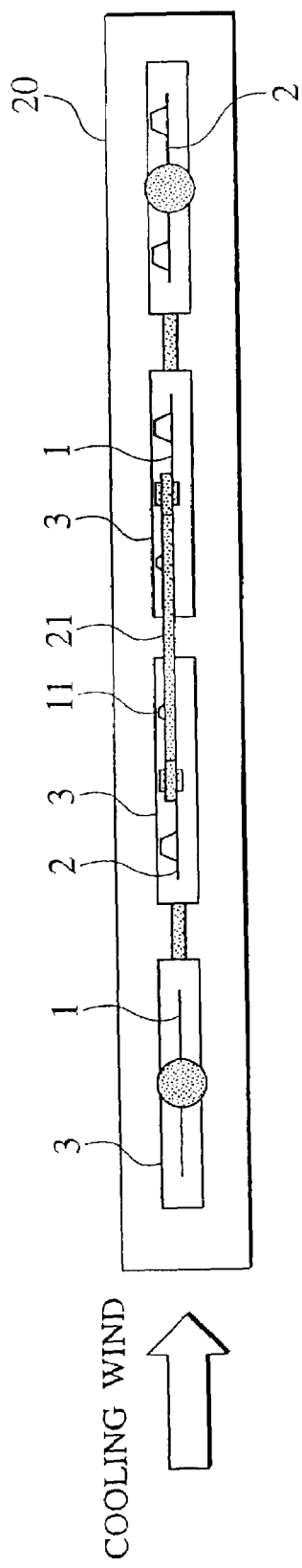
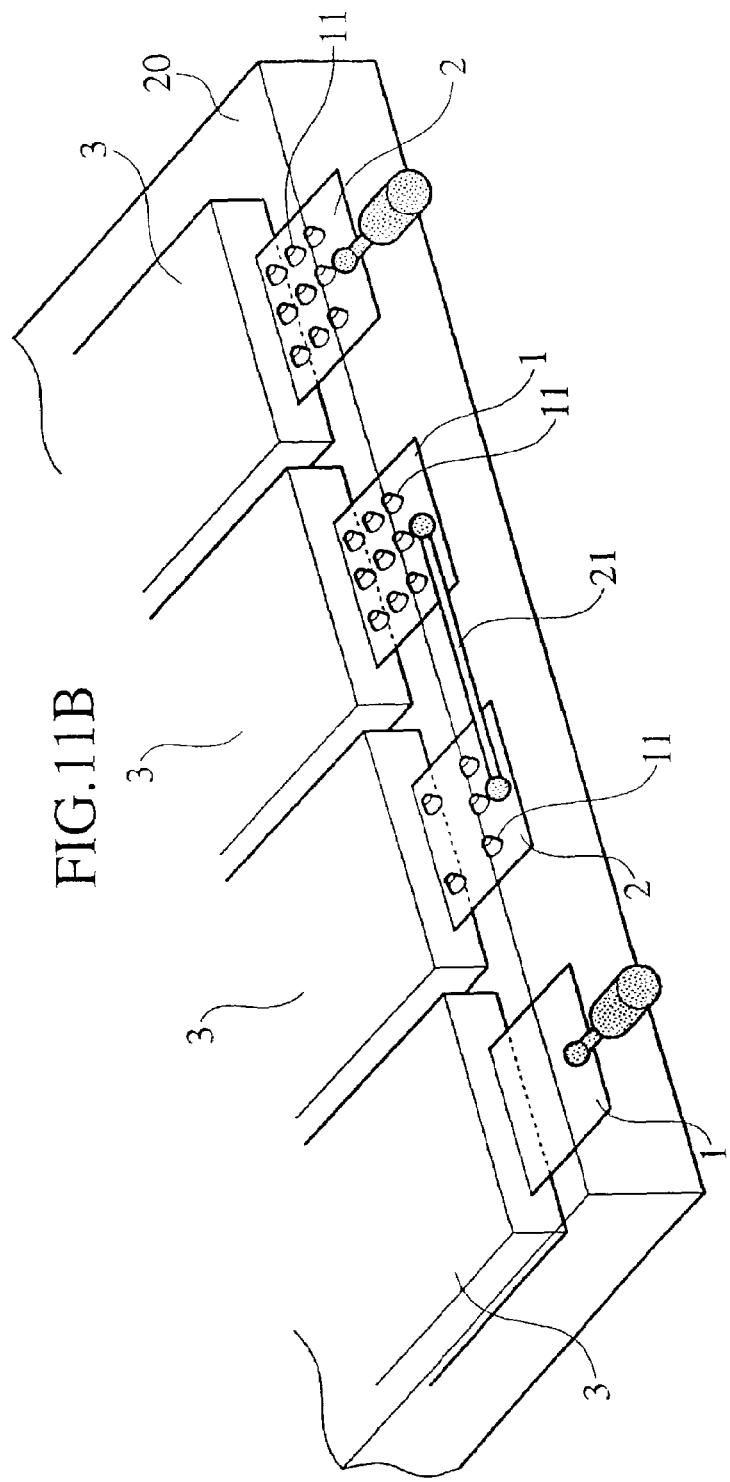

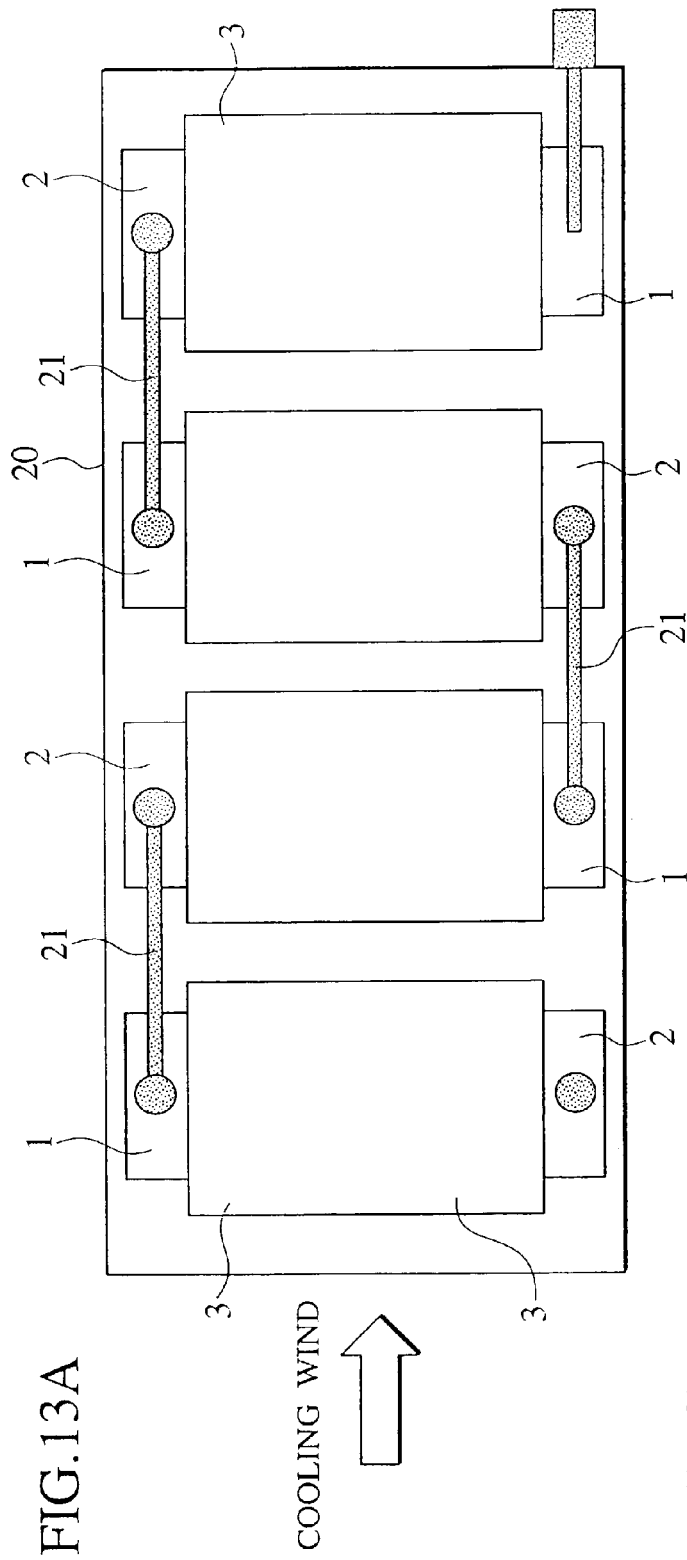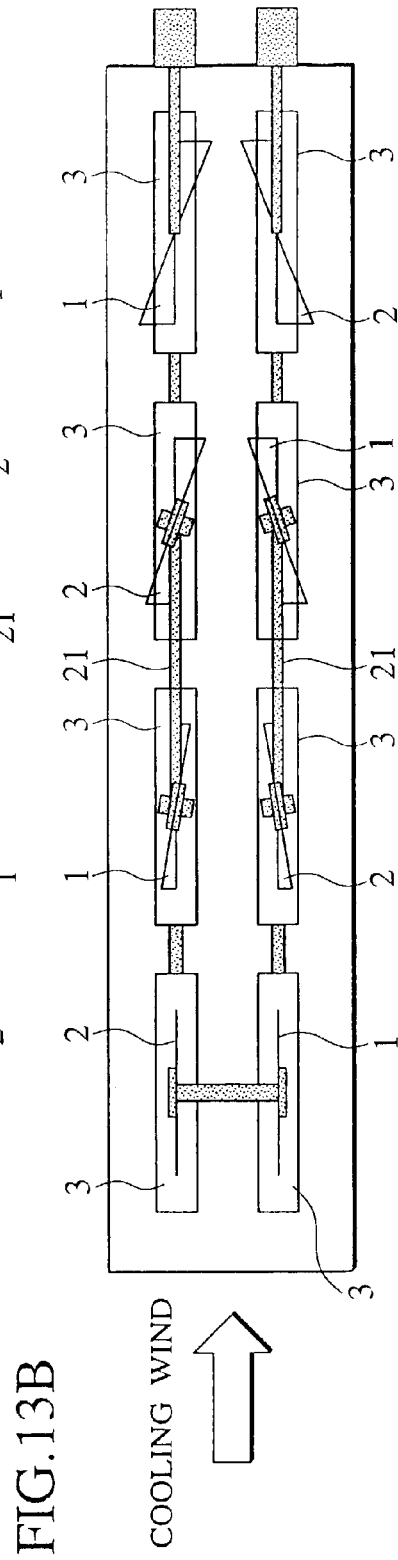

BATTERY FORMED OF A STACK OF SUBSTANTIALLY RECTANGULAR ELECTRODES

BACKGROUND OF THE INVENTION

1. Field of the Invention

The present invention relates to a battery, in which a large number of positive and negative electrodes formed to be approximately rectangular are stacked, and a laminate film compounded of polymer and metal is used for a battery enclosure. More particularly, the present invention relates to a terminal electrode structure in such a battery and a structure of an assembled battery using such batteries.

2. Description of the Related Art

In recent years, an electric vehicle using electricity as a power source and a hybrid vehicle running by engine and electric motor in combination have attracted attention under the situation where the air pollution caused by automotive exhaust gas has been a global problem. Development of a battery having high energy density and high output density, which is mounted on the electric vehicle or the hybrid vehicle, has occupied an important position in the industry. In the case of using the battery for such a purpose, it is necessary to flow a large electric current therethrough. Thus, in the case of using a metal can for a battery enclosure, as disclosed in Japanese Patent Application Laid-Open No. 2000-348772, a structure has been adopted, in which thick metal terminals are connected to a positive electrode collector and a negative electrode collector in the battery enclosure for the purpose of drawing an electric current to the outside of the battery.

SUMMARY OF THE INVENTION

However, a laminate film compounded of polymer and metal is used for the enclosure of the battery in order to realize higher energy and output thereof. In the case of using a thick metal wire or a metal stick as an electrode terminal for drawing an electric current to the outside in this battery, there has been a problem that a sufficient sealing property cannot be obtained in the sealed portion of the electrode terminal protruded from the battery enclosure. Furthermore, in such a battery using the laminate film, an adhesive polymer film is usually used on the portion of the electrode terminal in contact with the laminate film. However, in the case of using a thin metal wire or metal foil for the purpose of obtaining a sufficient sealing property in the sealed portion of the electrode terminal protruded from the battery enclosure, when such a large current that is required for the electric vehicle or the hybrid vehicle is flown through the sealed portion, the terminal portion has been heated up, and the terminal temperature has been increased to the melting point of the adhesive polymer film, thus causing a problem of incapability of obtaining a sufficient sealing performance. Solution of the problem as described above has been a subject in the stacked battery using the above-described laminate film for the battery enclosure.

It is an object of the present invention to provide a battery, which is fabricated paying attention to the above-described subject in the conventional stacked battery using the laminate film compounded of polymer and metal, and is capable of controlling the heating of the electrode terminal portion sufficiently even if the large current required for the electric vehicle or the hybrid vehicle is flown therethrough.

An aspect of the present invention provides a battery comprising: a battery enclosure formed of a laminate film compounded of a metal and a polymer material, the battery enclosure having a substantially rectangular shape; a power-generating unit accommodated in the battery enclosure, the power-generating unit comprising positive electrodes including portions of positive electrode collectors having substantially rectangular shapes; negative electrodes including portions of negative electrode collectors having substantially rectangular shapes; and separators separating the positive electrodes from the negative electrodes, wherein the power-generating unit is formed by stacking the positive electrodes, the separators and the negative electrodes, each of the separators being disposed between each of the positive electrodes and each of the negative electrodes; and terminal electrodes comprising a positive terminal electrode and a negative terminal electrode, width of the positive terminal electrode being substantially equal to that of each of the positive electrode collectors, width of the negative terminal electrode being substantially equal to that of each of the negative electrode collectors, the positive terminal electrode and the negative terminal electrode protruding from mutually different sides of the battery enclosure, and portions of the terminal electrodes, which protrude from the battery enclosure, being defined as protruding portions, wherein each of the positive electrode collectors is electrically connected to the positive terminal electrode in the battery enclosure, and each of the negative electrode collectors is electrically connected to the negative terminal electrode in the battery enclosure.

BRIEF DESCRIPTION OF THE DRAWINGS

The present invention will now be described with reference to the accompanying drawings wherein:

FIG. 1A is a cross-sectional view of a first embodiment of a battery according to the present invention;

FIG. 1B is a plan view showing an exterior appearance of the battery shown in FIG. 1A;

FIG. 1C is a plan view showing a modification example of the first embodiment of the battery according to the present invention;

FIGS. 2A and 2B are a cross-sectional view showing a second embodiment of the battery according to the present invention;

FIG. 8A is a plan view showing one example of an assembled battery formed of the batteries shown in FIG. 3A;

FIG. 8B is a side view showing the example of the assembled battery formed of the batteries shown in FIG. 3A;

FIG. 10A is a side view showing one example of an assembled battery formed of the batteries shown in FIG. 6A;

FIG. 10B is a schematic perspective view showing the example of the assembled battery formed of the batteries shown in FIG. 6A;

FIG. 11A is a side view showing one example of an assembled battery formed of the batteries shown in FIG. 7A;

FIG. 11B is a schematic perspective view showing the example of the assembled battery formed of the batteries shown in FIG. 7A;

FIG. 13A is a plan view showing another example of the assembled battery in which the assembled batteries shown in FIGS. 8A and 8B are arranged in two steps;

FIG. 13B is a side view showing the example of the assembled battery in which the assembled batteries shown in FIGS. 8A and 8B are arranged in two steps;

DETAILED DESCRIPTION OF THE PREFERRED EMBODIMENTS

Figure 3A:
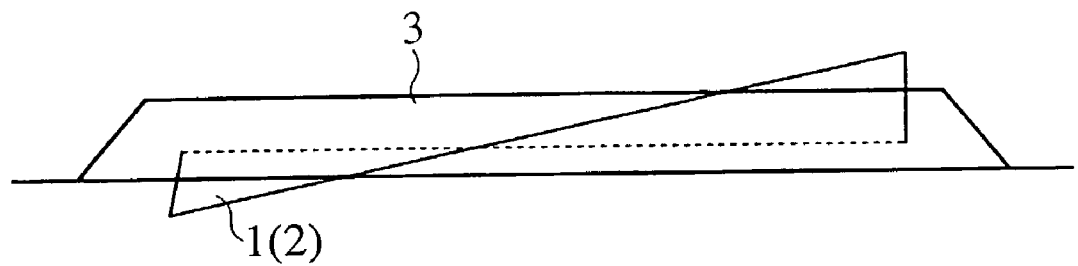
FIGS. 3A and 3B are schematic views showing a third embodiment of the battery according to the present invention, and showing examples where terminal electrodes are subjected to twist deformation.

Hereinafter, in order to describe the present invention more in detail, preferred embodiments of this invention will be explained with reference to the accompanying drawings below.

As shown in FIGS. 1A, 1B, 1C, 2A and 2B, a battery according to the present invention includes a battery enclosure 3, a power-generating unit 50 and positive and negative terminal electrodes 1, 2. The power-generating unit 50 is accommodated in the rectangular battery enclosure 3 formed of a composite laminate film. The positive terminal electrode 1 has a width substantially equal to a width of the positive electrode collector 5 of the power-generating unit 50. The negative terminal electrode 2 has a width substantially equal to a width of the negative electrode collector 7 of the power-generating unit 50. The positive and negative terminal electrodes 1 and 2 protrude from mutually different sides of the rectangular battery enclosure 3. In the battery, the positive and negative electrode collectors 5, 7 are electrically connected to the positive and negative terminal electrodes 1, 2 in the battery enclosure 3, respectively. Alternatively, the positive and negative terminal electrodes 1, 2 are formed so as to protrude from the battery enclosure 3 by stacking the respective end portions of the positive and negative electrode collectors 5, 7.

Namely, as shown in FIGS. 1A to 1C, the power-generating unit 50 is configured by stacking the positive electrodes 4, the negative electrodes 6 and separators 8. Each of the separators 8 is located between each of the positive electrodes 4 and each of the negative electrodes 6. The power-generating unit 50 is hermetically sealed by the battery enclosure 3 composed of a laminate film compounded of polymer and metal.

FIG. 1A shows the internal structure of the battery. The end portions of the collectors 5 of the respective positive electrodes 4 are extended together from one sides of the separators 8 to the left in the drawing and are protruded from the battery enclosure 3 in a stacked state, and thus a positive terminal electrode 1 is formed. The end portions of the collectors 7 of the respective negative electrodes 6 are extended together from the other sides of the separators 8 to the right in the drawing and are protruded from the battery enclosure 3 in the stacked state, and thus a negative terminal electrode 2 is formed. The positive terminal electrode 1 formed of the plurality of positive electrode collectors 5 and the negative terminal electrode 2 formed of the plurality of negative electrode collectors 7 are not only protruded from two opposite sides of the rectangular battery enclosure 3 as described above (refer to FIG. 1B), respectively, but also may be protruded from two adjacent sides thereof as shown in FIG. 1C, respectively.

As shown in FIG. 2A, the collectors 5 and 7 of the stacked positive and negative electrodes may be connected to current-drawing terminal electrodes 9 and 10 in the inside of the battery enclosure, respectively. The current-drawing terminal electrodes 9 and 10 have a width approximately equal to that of the collectors 5 and 7, respectively. It is also possible to form the positive and negative terminal electrodes 1 and 2 by protruding these terminal electrodes 9 and 10 from the battery enclosure 3.

As described above, in the battery according to the present invention, the stacked electrode collectors directly function as the terminal electrodes. Alternatively, the wide current-drawing terminal electrodes attached to the collectors in the battery enclosure are directly protruded therefrom. Therefore, the heating of the terminal portions can be sufficiently controlled in the case of drawing a large current. Moreover, also in the case of forming an assembled battery by connecting these batteries to one another, the batteries can be mutually connected relatively simply by use of means such as, for example, ultrasonic welding, without using bolts and the like conventionally. Thus, a sufficient welding area is secured, thereby lowering the resistance of the entire assembled battery and achieving the lightweight thereof.

Moreover, as shown in FIG. 2B, each of the positive and negative electrode collectors 5, 7 includes at least one collector thicker than the other collectors. Namely, as shown in FIG. 2B, thickness of one collector T52 of the positive electrode collectors 5 is larger than that of the other collectors T51 of the positive electrode collectors 5. Similarly, thickness of one collector T72 of the negative electrode collectors 7 is larger than that of the other collectors T71 of the negative electrode collectors 7. Another structure can be adopted, in which such thick collectors 5, 7 function as the positive and negative terminal electrodes, and protrude from the battery enclosure 3. The other positive and negative collectors 5, 7 are electrically connected to such thick collectors 5, 7 for the terminal electrodes (see FIG. 2B). Therefore, the heating of the terminal portions in the case of drawing a large current is controlled. Further, the strength of the battery is increased by the rigidity of the thick collectors 5, 7, and even if some force is applied to the battery from the outside due to some reasons, the shape of the battery is maintained.

It is desirable that the material of the terminal electrodes 1, 2 be composed of a three-dimensional deformable metal. In order to improve a lifetime of the battery, it is effective to control the temperature increase of the battery as minimum as possible by applying a cooling wind to the battery. However, the three-dimensional deformable metal is used for the faces of the positive and negative terminal electrodes 1 and 2, which are defined by the length direction of the battery (same direction as the direction of drawing the terminal electrodes 1 and 2), the width direction thereof (direction perpendicular to the direction of drawing the terminal electrodes 1 and 2) or the direction including both of the length and width directions. Therefore, the angles and the like of the terminal electrodes 1 and 2 can be freely changed. Accordingly, it becomes possible to adjust the amount and direction of the cooling wind, and thus the cooling effect is improved.

Figure 3B:
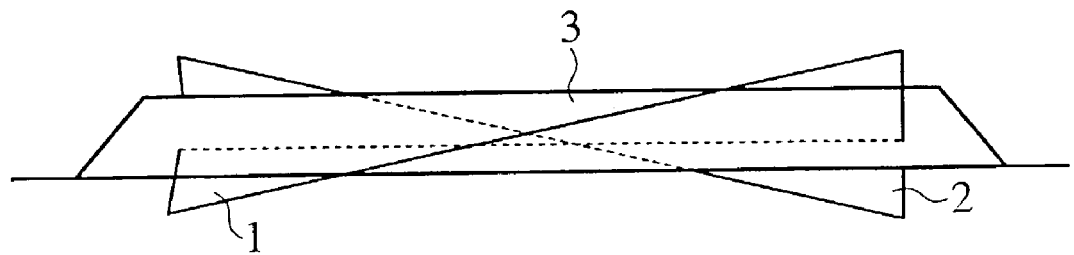

For example, FIGS. 3A and 3B show structures of batteries, in which the protruding portions of the positive and negative terminal electrodes 1 and 2 are subjected to twist deformation around center axes of directions in which the terminal electrodes 1, 2 protrude. The angles are applied to the terminal electrodes 1 and 2 as described above, and thus the cooling wind sent to the terminal electrode portions is rectified to the directions of the upper and lower faces of each battery. Thus, warmed air can be diverted to the directions described above. Therefore, the cooling effect is improved, and the lifetime of the battery is improved.

Figure 4A:
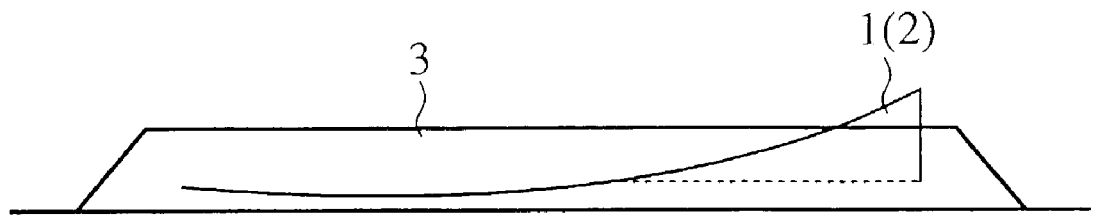
FIGS. 4A, 4B and 4C are schematic views showing a fourth embodiment of the battery according to the present invention, and showing examples where one-side edges of the terminal electrodes are deformed to front and back surface sides thereof.
Figure 4B:
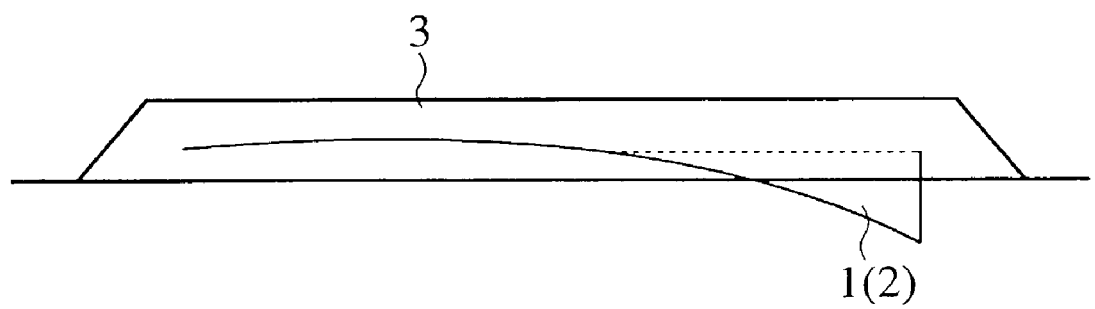
Figure 4C:
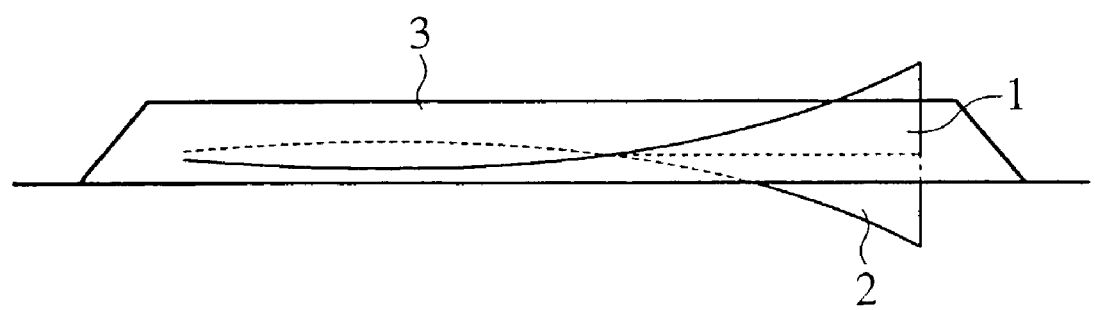

As shown in FIGS. 4A to 4C, structures can also be adopted, in which the one-side end portions in the width directions of the positive and negative terminal electrodes 1 and 2 protruding from the battery enclosure 3 are deformed to the directions of the upper and lower faces of the battery. With such a structure, the cooling wind is rectified similarly, the cooling effect is enhanced, and the lifetime of the battery is improved.

Figure 5A:
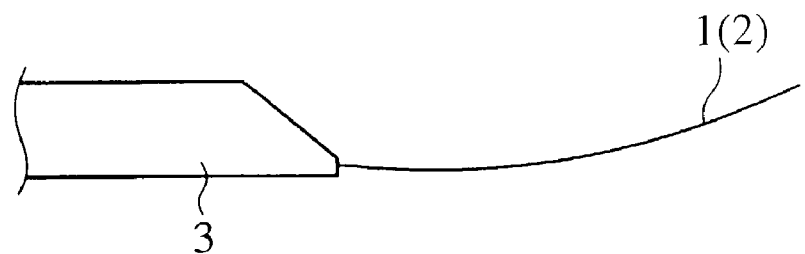
FIGS. 5A, 5B and 5C are schematic views showing a fifth embodiment of the battery according to the present invention, and showing examples where tip portions of the terminal electrodes are deformed to the front and back surface sides thereof.
Figure 5B:
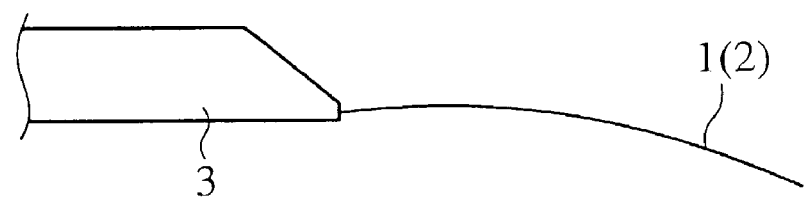
Figure 5C:
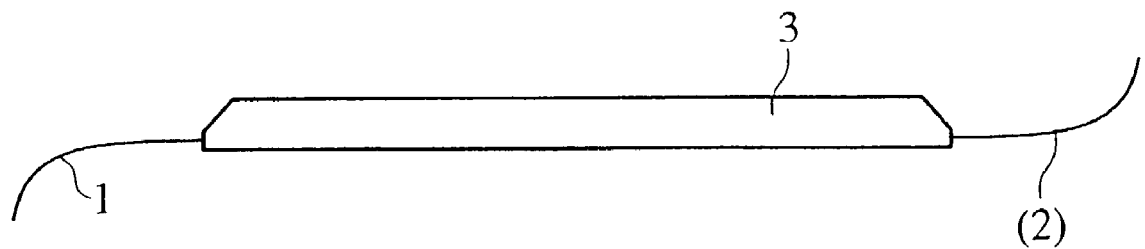

As shown in FIGS. 5A to 5C, structures can also be adopted, in which the tip portions of the protruding portions of the positive and negative electrodes 1 and 2 are deformed to the directions of the upper and lower faces of the battery. The cooling effect is enhanced similarly to the above-described batteries, and the lifetime of the battery is improved.

Figure 6A:
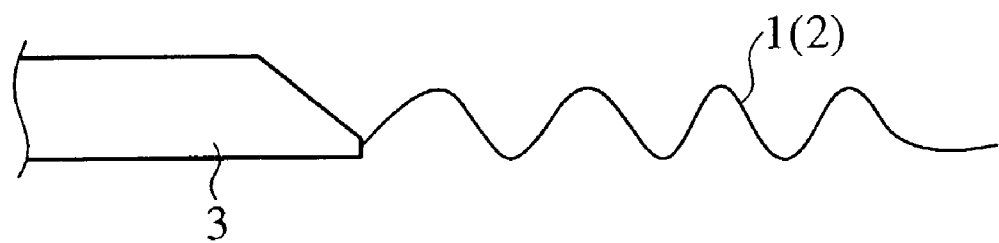
FIGS. 6A and 6B are schematic views showing a sixth embodiment of the battery according to the present invention, and showing examples where waveform rugged portions are formed in the terminal electrodes in a protruding and width directions thereof.
Figure 6B:
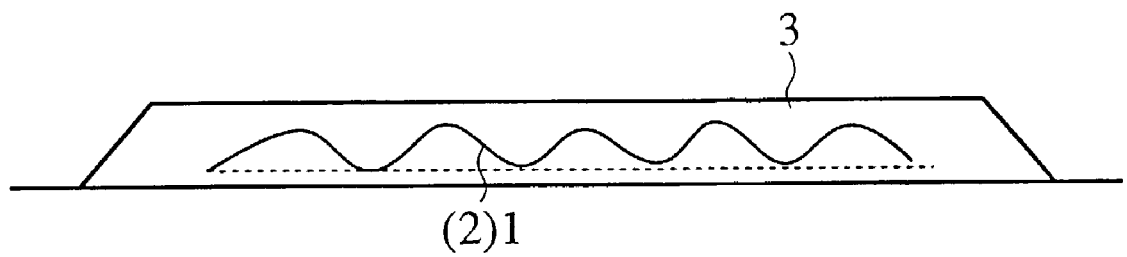

As shown in FIGS. 6A and 6B, structures can also be adopted, in which the protruding portions of the positive and negative electrodes 1 and 2, which protrude from the battery enclosure 3, are provided with waveform rugged portions in the length or width directions thereof. Swirling flows can be generated in the cooling wind by these waveform rugged portions. Thus, the cooling of the terminal electrode portions becomes even, and the temperature distribution becomes even. Accordingly, the lifetime of the battery is improved. In addition, the surface areas of the terminal electrodes 1 and 2 can be expanded more than flat terminals without increasing the mounting area of the battery, thereby enhancing the cooling effect for the terminal electrodes 1 and 2 and the entire battery.

Figure 7A:
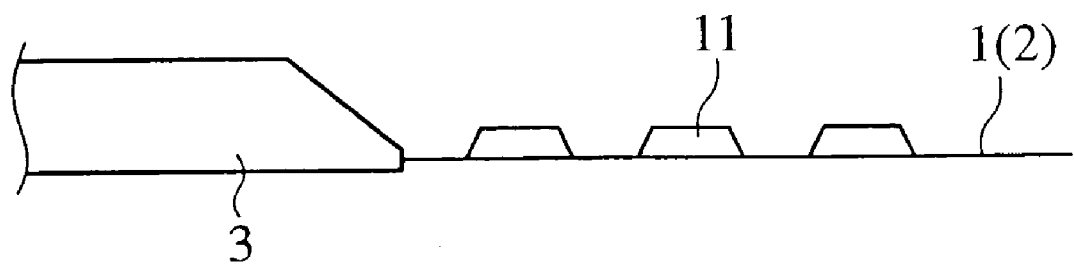
FIGS. 7A and 7B are schematic views showing a seventh embodiment of the battery according to the present invention, and showing examples where projections are formed on the front surface and on the back surfaces of the terminal electrodes.
Figure 7B:
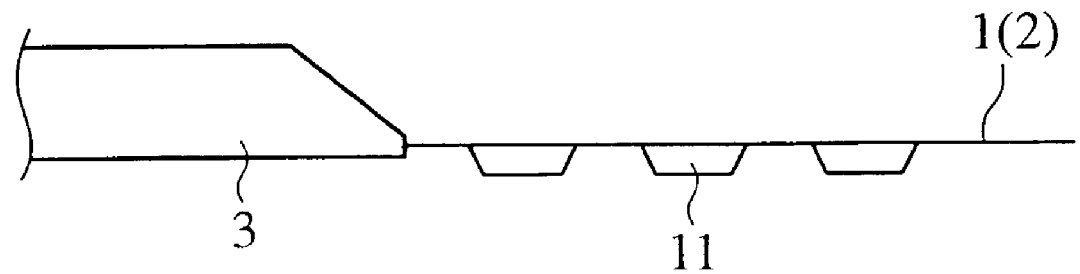

As shown in FIGS. 7A and 7B, projections 11 may be formed on the front and/or back surface sides of the protruding portions of the positive and negative terminal electrodes 1 and 2. Swirling flows are generated in the cooling winds from the length and/or width directions of the battery similarly to the batteries shown in FIGS. 6A and 6B. Therefore, the terminal electrode portions are cooled evenly, and the temperature distribution becomes even, whereby the lifetime of the battery is improved.

It is desirable to select a material of the positive and negative terminal electrodes 1 and 2 as described above from, for example, ones mainly containing Al, Cu, Ni, SUS (stainless steel), iron, gold and silver, considering required properties including strength, workability and nonreaction with a material used for the battery excluding battery reaction. However, the electrode material is not particularly limited to these. Moreover, positive and negative electrodes capable of occluding/desorbing lithium ions may also be used for the electrodes of the battery. It is desirable to use a positive electrode active material mainly composed of one selected from $LiCoO_2$, $LiMn_2O_4$ and $LiNiO_2$ for the positive electrode, and to use a negative electrode active material mainly composed of one selected from graphite and hard carbon as amorphous carbon for the negative electrode. However, the active materials are not particularly limited to these materials. For an electrolyte solution, one obtained by impregnating a nonaqueous electrolyte solution into the separators, a solid electrolyte or a gel electrolyte, or a solid or gel electrolyte including the separators 8 may be used.

In the present invention, one obtained by providing at least two pieces of batteries as described above in an outer case can be used as an assembled battery. Particularly, the assembled battery is composed by using batteries in which terminal electrode portions are deformed and projections are provided thereon, thereby restricting the temperature increase of the assembled battery and improving the lifetime thereof.

FIGS. 8A and 8B show an assembled battery, in which a plurality of batteries shown in FIG. 3A, which are composed by subjecting the positive and negative terminal electrodes 1 and 2 to the twist deformation, are provided in an outer case 20, and these batteries are connected in series by inter-battery connection leads 21. In FIGS. 8A and 8B, the number of batteries is four. The batteries are arrayed such that the twist angles of the terminal electrodes 1 and 2 become larger from the windward toward leeward of the cooling wind for cooling the battery, which is indicated by arrows in the drawings. Usually, the temperature of the cooling wind is increased toward the leeward, and the assembled battery becomes more difficult to be cooled, whereby the temperature in the assembled battery becomes higher toward the leeward. However, the batteries are arrayed such that the twist angles of the terminal electrodes become larger toward the leeward, and thus areas in contact with the cooling wind can be increased toward the leeward. Further, it becomes possible to receive the cooling wind more effectively toward the leeward without providing any complicated rectification structure in the outer case 20. Moreover, the warmed cooling wind can be diverted to the directions of upper and lower faces of each battery. Therefore, the temperature distribution in the assembled battery becomes even, so that the endurance lifetime of the assembled battery is improved.

Figure 9:
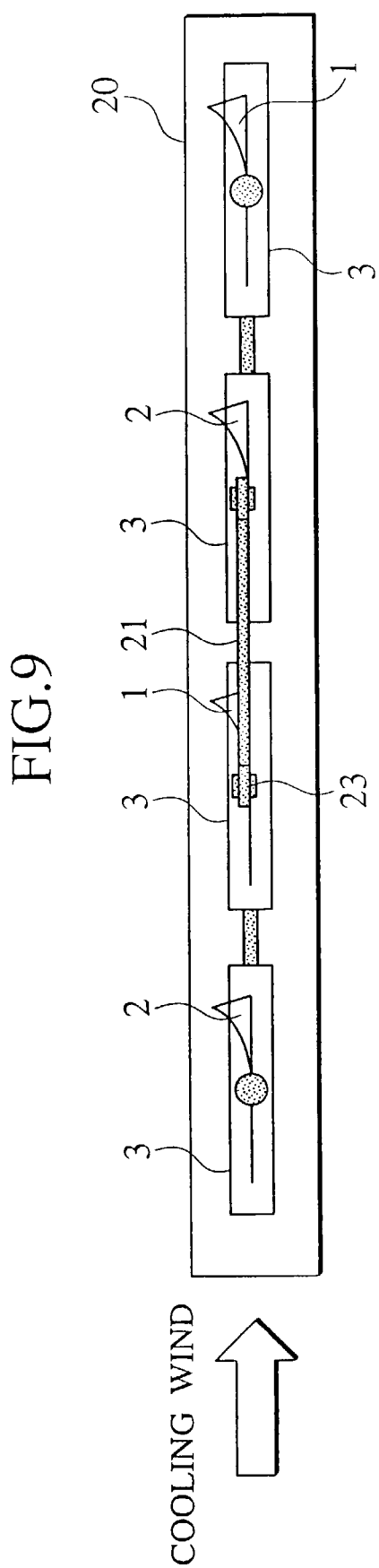
FIG. 9 is a side view showing one example of an assembled battery formed of the batteries shown in FIG. 4A.

FIG. 9 shows an assembled battery, in which a plurality of batteries shown in FIG. 4A, which are composed by deforming the side edge portions of the positive and negative terminal electrodes 1 and 2 to the front surface side thereof, are provided in the outer case 20 similarly to FIGS. 8A and 8B, and are arrayed such that the deformation amounts of the ends of the electrodes to the upper direction are increased from the windward toward leeward of the cooling wind for the batteries. With such a structure, the amount of the cooling wind flowing on the battery surface is increased toward the leeward. Further, areas in contact with the cooling wind are increased toward the leeward, such that a necessity of providing a complicated rectification structure in the outer case is eliminated. Accordingly, the temperature distribution in the assembled battery becomes even, and the lifetime of the assembled battery is improved.

FIGS. 10A and 10B show an assembled battery, in which a plurality of batteries shown in FIG. 6A, which have waveform rugged portions formed in the positive and negative terminal electrodes 1 and 2, are provided in the outer case 20 similarly to FIG. 9, and are arrayed such that the amplitude amounts of the waveform rugged portions are increased from the windward toward leeward of the cooling wind for the batteries. With such a structure, swirling flows becoming larger from the windward to the leeward are generated in the cooling wind. Thus, the cooling of the terminal electrode portions becomes even, thus eliminating the necessity of providing a complicated structure in the outer case similarly. Therefore, the temperature distribution in the assembled battery can be made even, and the lifetime of the assembled battery is improved.

FIGS. 11A and 11B show an assembled battery, in which batteries shown in FIG. 7A, which have the projections 11 formed in the protruding portions of the positive and negative terminal electrodes 1 and 2 from the battery enclosure 3, are provided in the outer case 20 similarly to FIGS. 10A and 10B, and are arrayed such that the number of projections 11 on the terminal electrodes is increased from the windward toward leeward of the cooling wind. By adopting such a structure, swirling flows can be actively generated in the cooling wind from the windward to the leeward. Hence, the terminal electrodes 1 and 2 are cooled evenly, and a complicated rectification structure does not need to be used. Accordingly, the temperature distribution in the assembled battery is made even, and the lifetime of the assembled battery is improved.

Figure 12:
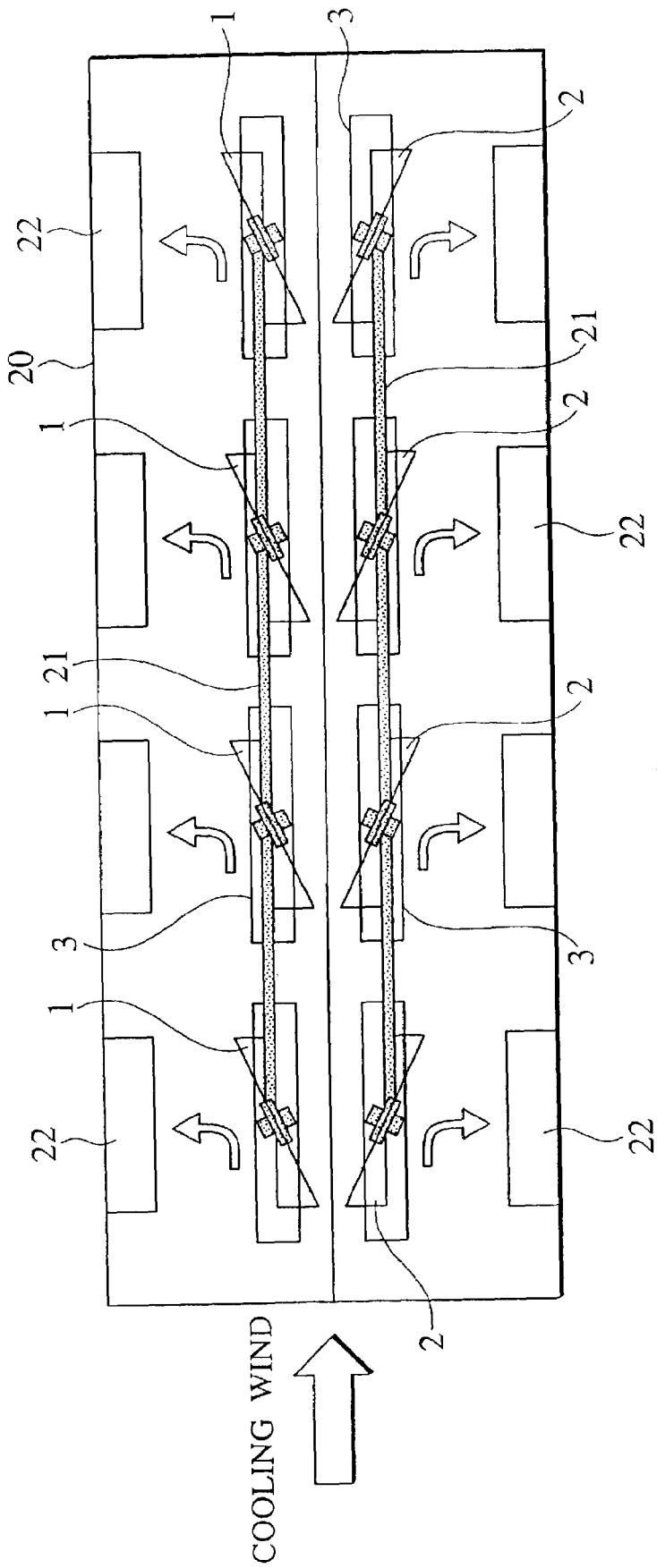
FIG. 12 is a side view showing one example of an assembled battery, in which the assembled batteries shown in FIGS. 8A and 8B are arranged in two steps, and a cooling wind is rectified toward a battery control circuit.

FIG. 12 shows an assembled battery, in which the batteries shown in FIG. 3A are used, and the angles of the terminal electrodes 1 and 2 are adjusted so as to rectify the cooling wind for the batteries to the battery control circuits 22 provided in the outer case 20. Thus, the temperature distribution of the control circuits 22 can also be made even, and the reliability of the control circuits 22 is improved.

The assembled batteries in which the plurality of batteries equipped with the positive and negative terminal electrodes 1 and 2 composed of the material and formed in the shape as described above are provided in the case can be configured such that at least two sets thereof are provided each in the upper and lower directions or the right and left directions, further in the upper and lower directions and the right and left directions.

EXAMPLES

Hereinafter, the present invention will be described more concretely based on the Examples.

Example 1

The battery enclosure 3 was composed of a laminate film formed by sandwiching aluminum foil between nylon 6 and denatured PP (polypropylene). The positive electrode 4 was composed by using aluminum foil having a thickness of approximately 20 μm as the positive electrode collector 5 and by coating $LiMn_2O_4$ as a positive electrode active material on the aluminum foil. The negative electrode 6 was composed by using copper foil having a thickness of approximately 10 μm as the negative electrode collector 7 and by coating hard carbon that is amorphous carbon as a negative electrode active material on the copper foil. As shown in FIGS. 2A and 2B, the laminate film 3, the positive electrode 4, the negative electrode 6 and the separator 8 were stacked in order of the laminate film 3, the negative electrode 6, the separator 8 and the positive electrode 4.

Next, the positive electrode collector 5 and the negative electrode collector 7 were protruded by the width of 40 mm from the mutually opposite positions of the separator 8 having a rectangular shape. An aluminum-made positive terminal electrode 9 having a thickness of approximately 200 μm, a width of approximately 40 mm and a length of 30 mm was welded to the positive electrode collector 5. A nickel-made negative terminal electrode 10 having the same dimension as the aluminum-made positive terminal electrode 9 was welded to the negative electrode collector 7. These positive terminal electrode 9 and negative terminal electrode 10 were sandwiched by the laminate film as the battery enclosure 3. As shown in FIG. 1B, the positive and negative terminal electrodes 1 and 2 were composed of portions in which the positive and negative terminal electrodes 9 and 10 are protruded from the battery enclosure 3 by the length of approximately 20 mm. The peripheral portions of the positive and negative terminal electrodes 1 and 2 were heated and welded together, and the entire body was sealed, thereby fabricating a battery whose capacity is approximately 2 Ah.

Example 2

The positive and negative terminal electrodes 1 and 2 were protruded from two sides of a battery enclosure 3, which are adjacent to each other, and thus the positive and negative terminal electrodes 1 and 2 were protruded from the laminate film of the battery enclosure 3 so as to make an angle of 90° (refer to FIG. 1C). The battery was fabricated similarly to the above-described Example 1 besides the above.

Example 3

A battery was fabricated similarly to Example 1. As shown in FIG. 3A, the positive and negative terminal electrodes 1 and 2 were subjected to twist deformation, and a structure was made, in which the positive and negative terminal electrodes 1 and 2 have angles equal to each other with respect to the plane direction of the battery.

Example 4

A battery was fabricated similarly to Example 1. As shown in FIG. 3B, the positive and negative terminal electrodes 1 and 2 were subjected to twist deformation, and a structure was made, in which the positive and negative terminal electrodes 1 and 2 have angles reverse to each other with respect to the plane direction of the battery.

Example 5

A battery was fabricated similarly to Example 1. As shown in FIG. 4A, a structure was made, in which the one-side ends of the terminal electrodes 1 and 2 in the width direction were deformed to the upper direction of the battery.

Example 6

A battery was fabricated similarly to Example 1. As shown in FIG. 4B, a structure was made, in which the one-side ends of the terminal electrodes 1 and 2 in the width direction were deformed to the lower direction of the battery.

Example 7

A battery was fabricated similarly to Example 1. As shown in FIG. 4C, a structure was made, in which the one-side ends of the terminal electrodes 1 and 2 in the width direction were deformed to directions different from each other, that is, the upper and lower directions of the battery, respectively.

Example 8

A battery was fabricated similarly to Example 1. As shown in FIG. 5A, a structure was made, in which the tip portions of the terminal electrodes 1 and 2 were deformed to the upper direction of the battery.

Example 9

A battery was fabricated similarly to Example 1. As shown in FIG. 5B, a structure was made, in which the tip portions of the terminal electrodes 1 and 2 were deformed to the lower direction of the battery.

Example 10

A battery was fabricated similarly to Example 1. As shown in FIG. 5C, a structure was made, in which the tip portions of the terminal electrodes 1 and 2 were deformed to directions different from each other, that is, the upper and lower directions of the battery, respectively.

Example 11

A battery was fabricated similarly to Example 1. As shown in FIG. 6A, a structure was made, in which waveform rugged portions having a cycle between peaks of 5 mm are formed on the terminal electrodes 1 and 2 in the length direction of the battery.

Example 12

A battery was fabricated similarly to Example 1. As shown in FIG. 6B, a structure was made, in which waveform rugged portions having a cycle between peaks of 9 mm are formed in the terminal electrodes 1 and 2 in the width direction of the battery.

Example 13

A battery was fabricated similarly to Example 1. As shown in FIG. 7A, projections having convex portions on the upper face of the battery were formed on the terminal electrodes 1 and 2.

Example 14

A battery was fabricated similarly to Example 1. As shown in FIG. 7B, projections having convex portions on the lower face of the battery were formed on the terminal electrodes 1 and 2.

Example 15

Batteries were fabricated similarly to Example 3, and the positive and negative terminal electrodes 1 and 2 were subjected to twist deformation. As shown in FIGS. 8A and 8B, the batteries were arranged in the outer case 20 in a state where the respective terminal electrodes 1 and 2 were deformed at angles of 0°, 10°, 20° and 30° with respect to the level surface from the windward of the cooling wind at the left side in the drawing, and thus an assembled battery was configured. For connections between the respective single batteries, lead wires having a diameter of 8 mm were used as the inter-battery connection leads 21, and the terminals of the batteries, which are adjacent to each other, were connected in series by screws 23.

Example 16

As shown in FIGS. 13A and 13B, assembled batteries fabricated similarly to Example 15 were stacked in two layers. Further, the respective positive and negative terminal electrodes 1 and 2 in the upper assembled battery were deformed at the angles of 0°, 10°, 20° and 30° with respect to the level surface as described above. The positive and negative terminal electrodes 1 and 2 in the lower assembled battery were deformed at angles of 0°, −10°, −20° and −−30° in the direction reverse to the above, respectively. These upper and lower assembled batteries were arranged in the outer case 20, and the respective single batteries were mutually connected in series.

Example 17

Batteries were fabricated similarly to Example 5, and as shown in FIG. 9, the batteries were arrayed in the outer case 20 so as to get along with the flowing direction of the cooling wind. Moreover, the single batteries were mutually connected in series through the inter-battery connection leads 21, and thus an assembled battery was fabricated.

Example 18

Figure 14:
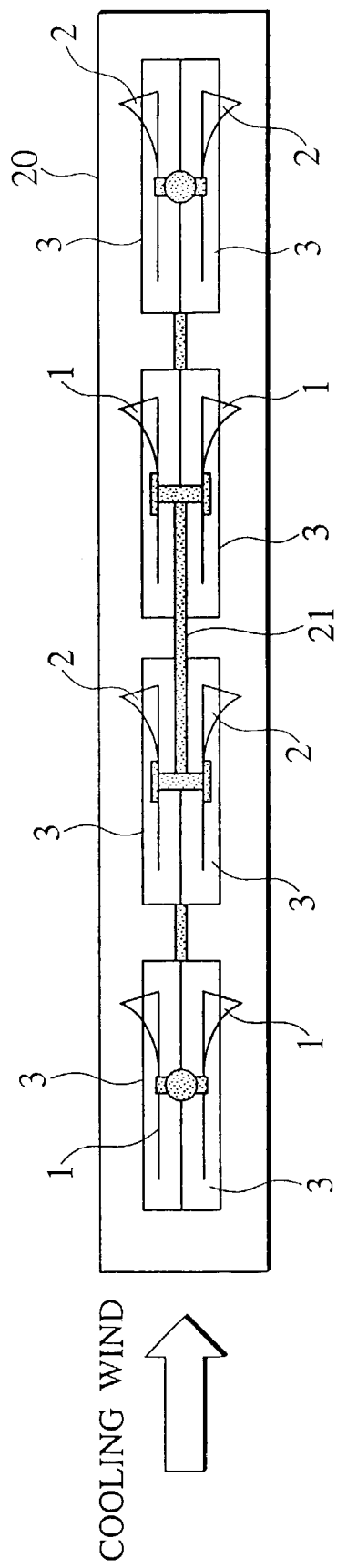
FIG. 14 is a side view showing one example of an assembled battery, in which the assembled batteries shown in FIG. 9 are arranged in two steps.

As shown in FIG. 14, assembled batteries fabricated similarly to the above-described Example 17 were stacked in two layers. Furthermore, the assembled batteries were arranged such that the deforming direction of the positive and negative terminal electrodes 1 and 2 in the lower assembled battery was reverse to the deforming direction of the positive and negative terminal electrodes 1 and 2 in the upper assembled battery. Thus, a two-step assembled battery was fabricated.

Example 19

Batteries were fabricated similarly to Example 11. The batteries were arranged in the outer case 20 such that the amplitudes of the waveform rugged portions formed on the positive and negative terminal electrodes 1 and 2 were 0, 1, 2 and 4 mm from the windward of the cooling wind. Further, the respective single batteries were mutually connected in series by the connection leads 21, and thus an assembled battery as shown in FIGS. 10A and 10B was obtained.

Example 20

Batteries were fabricated similarly to Example 13. The batteries were arranged in the outer case 20 such that the numbers of projections 11 formed on the positive and negative terminal electrodes 1 and 2 were 0, 5, 8 and 9 from the windward. In addition, the respective single batteries were connected in series by the connection leads 21, and thus an assembled battery as shown in FIGS. 11A and 11B was obtained.

Example 21

Batteries fabricated similarly to Example 3 were arranged in four columns and two steps in the outer case 20. The respective positive and negative terminal electrodes 1 and 2 were deformed at an angle of 20° with respect to the level surface so as to be capable of rectifying the cooling wind toward the control circuits 22. A structure was made, in which not only the batteries but also the control circuits 22 can be cooled by the cooling wind, and thus an assembled battery as shown in FIG. 12 was obtained.

Comparative Example

The battery enclosure 3, the negative electrodes 6, the separators 8 and the positive electrodes 4 were stacked in this order by use of the positive electrodes 4, the negative electrodes 6 and the separators 8, which were similar to those of the above-described Example 1. The positive and negative electrode collectors 5 and 7 were protruded by the width of 10 mm from the opposite positions of the separators 8. A Ni-made electrode terminal having a thickness of approximately 200 μm, a width of approximately 10 mm and a length of 30 mm was welded to the positive electrode collectors 5. A Cu-made electrode terminal having the same dimension as the Ni-made electrode terminal was welded to the negative electrode collectors 7. These Ni-made and Cu-made electrode terminals were sandwiched by the laminate film as the battery enclosure 3. The Ni-made and Cu-made electrode terminals were protruded from the battery enclosure 3 by the length of approximately 20 mm, and were made as the positive and negative terminal electrodes 1 and 2, respectively. The peripheral portions of these positive and negative terminal electrodes 1 and 2 were heated and welded together, and the entire body was sealed, thereby fabricating a battery whose capacity is approximately 2 Ah.

Evaluation of Characteristics

Figure 15:
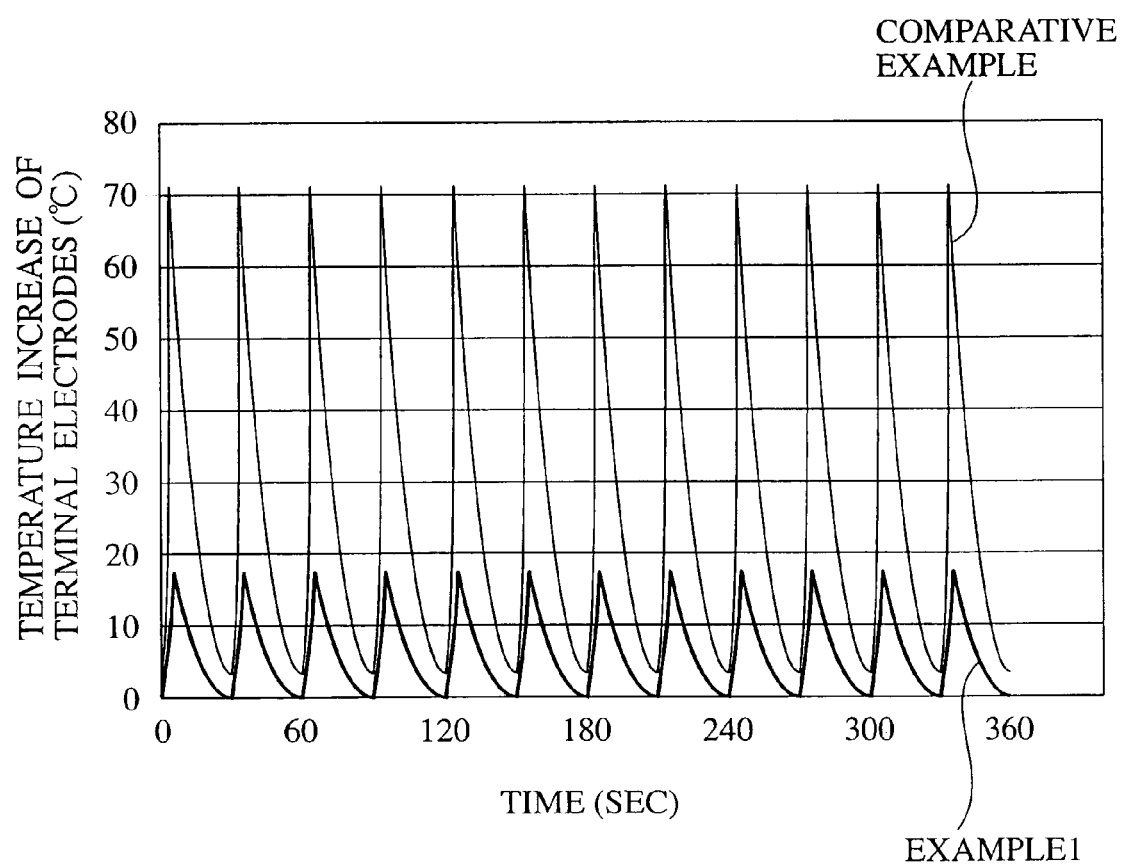
FIG. 15 is a graph showing measurement results of temperature increases of terminal electrodes of batteries of Example 1 and Comparative Example, which were obtained by carrying out discharge-pause cycle tests therefor.

In the batteries of Example 1 and Comparative Example, electric power at a current of 40 A that is equivalent to a current flowing at 20° C. is discharged for five seconds, and a pause is taken for fifty-five seconds thereafter. Regarding the above-described work as one cycle, a test having one minute a cycle was carried out ten cycles. The temperature increases of the terminal electrodes in this case were measured. FIG. 15 shows results thereof. As apparent from these results, it is understood that the temperature increase of the terminal electrode is controlled by adopting a wide electrode.

Furthermore, the temperature increases in the case of carrying out the discharge of the electric power at the current of 40 A that is equivalent to the current flowing at 20° C. for five seconds for the batteries of Examples 1 to 14 and Comparative Example were measured. The following table shows results thereof.

TABLE 1

| Classification | Temperature Increase of Terminal Electrodes ΔT (° C.) |
| --- | --- |
| Comparative Example | 69 |
| Example 1 | 18 |
| Example 2 | 18 |
| Example 3 | 16 |
| Example 4 | 17 |
| Example 5 | 16 |
| Example 6 | 16 |
| Example 7 | 15 |
| Example 8 | 16 |
| Example 9 | 17 |
| Example 10 | 14 |
| Example 11 | 15 |
| Example 12 | 14 |
| Example 13 | 15 |
| Example 14 | 15 |

As apparent from the Table 1, the terminal electrodes are deformed and imparted with the rectification effect for the cooling wind, whereby the temperature increase of the terminal electrodes can be controlled, and the lifetime of the battery can be improved.

As described above, according to the present invention, even if a large current is drawn, the temperature increase at the terminal electrodes can be sufficiently controlled by directly protruding the wide terminal electrodes from the battery enclosure. Moreover, the terminal electrodes directly protruded from the battery enclosure are composed of metal that is three-dimensional deformable in the length and/or width directions of the battery, and the cooling wind is rectified by deforming the terminal electrodes in appropriate directions and providing wave rugged portions or projections. In this way, the temperature increases of the terminal electrodes and the battery body can be controlled, thus bringing an extremely excellent effect that the lifetime of the battery can be improved significantly.

The present disclosure relates to subject matters contained in Japanese Patent Application No. 2001-379881, filed on Dec. 13, 2001, the disclosure of which is expressly incorporated herein by reference in its entirety.

While the preferred embodiments of the present invention have been described using specific terms, such description is for illustrative purposes. It is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention as defined in the following claims.

What is claimed is:

1. A battery comprising:
    a battery enclosure formed of a laminate film compounded of a metal and a polymer material, the battery enclosure having a substantially rectangular shape;
    a power-generating unit accommodated in the battery enclosure, the power-generating unit comprising a plurality of unit cells stacked on one another, each of the unit cells comprising a plurality of positive electrodes, a plurality of negative electrodes and a plurality of separators disposed between the positive electrodes and the negative electrodes, each of the positive electrodes, including a portion of a positive electrode collector, having a substantially rectangular shape with a first side of a first width, a second side adjacent the first side, a third side opposite to the first side, and a fourth side opposite to the second side; each of the negative electrodes, including a portion of a negative electrode collector, having a substantially rectangular shape with a fifth side of a fifth width, a sixth side adjacent the fifth side and parallel to the first side, a seventh side opposite to the fifth side, and an eighth side opposite to the sixth side; and
    terminal electrodes comprising a positive terminal electrode and a negative terminal electrode, a width of the positive terminal electrode being substantially equal to the first width of each of the positive electrodes, a width of the negative terminal electrode being substantially equal to the fifth width of each of the negative electrodes, the positive terminal electrode and the negative terminal electrode protruding from adjacent sides of the battery enclosure, respectively, and portions of the terminal electrodes, which protrude from the battery enclosure, being defined as protruding portions, each of the protruding portions including a flat plate portion in a flat plate shape, wherein the battery enclosure is sealed at both surfaces of the flat plate portion,
    wherein the positive electrode collectors have substantially rectangular shapes with ninth sides, each of the positive electrode collectors extends from the first side of the positive electrode and is electrically connected along the ninth side thereof to the positive terminal electrode inside the battery enclosure, and the negative electrode collectors have substantially rectangular shapes with tenth sides, each of the negative electrode collectors extends from the fifth side of the negative electrode and is electrically connected along the tenth side thereof to the negative terminal electrode inside the battery enclosure.

2. The battery according to claim 1, wherein materials of the terminal electrodes are composed of three-dimensional deformable metals.

3. The battery according to claim 1, wherein any of right and left side edge portions of the protruding portions are deformed to any of front and back surface sides of the terminal electrodes.

4. The battery according to claim 1, wherein the protruding portions are deformed to any of front and back surface sides of the terminal electrodes.

5. The battery according to claim 1, wherein the protruding portions are waveform rugged portions in any of length and width directions of the protruding portions.

6. The battery according to claim 1, wherein projections are provided on any of front and back surfaces of the protruding portions and on both of the front and back surfaces sides of the protruding portions.

7. The battery according to claim 1, wherein the width of positive terminal electrode is greater than half the width of the side of the enclosure from it protrudes and the width of negative terminal electrode is greater than half the width of the side of the enclosure from it protrudes.

8. The battery according to claim 1, wherein each of the positive electrode collectors is extended from the stack of unit cells, and each of the negative electrode collectors is extended from the stack of unit cells, so that the power generating unit is spaced-apart from both of the positive and negative terminal electrodes.

9. The battery according to claim 1, wherein the width of the positive terminal electrode is substantially equal to a width of the ninth side of each of the positive electrode collectors and the width of the negative terminal electrode is substantially equal to a width of the tenth side of each of the negative electrode collectors.

10. A battery comprising:

a battery enclosure formed of a laminate film compounded of a metal and a polymer material, the battery enclosure having a substantially rectangular shape;

a power-generating unit accommodated in the battery enclosure, the power-generating unit comprising a plurality of unit cells stacked on one another, each of the unit cells comprising a plurality of positive electrodes, a plurality of negative electrodes and a plurality of separators disposed between the positive electrodes and the negative electrodes, the positive electrodes, including portions of positive electrode collectors, having substantially rectangular shapes with first sides of a first width; the negative electrodes, including portions of negative electrode collectors, having substantially rectangular shapes with second sides of a second side width; and terminal electrodes comprising a positive terminal electrode and a negative terminal electrode, a width of the positive terminal electrode being substantially equal to the first width of each of the positive electrodes, a width of the negative terminal electrode being substantially equal to the second width of each of the negative electrodes, the positive terminal electrode and the negative terminal electrode protruding from mutually different sides of the battery enclosure, and portions of the terminal electrodes, which protrude from the battery enclosure, being defined as protruding portions, each of the protruding portions including a flat plate portion in a flat plate shape, wherein the battery enclosure is sealed at both surfaces of the flat plate portion, wherein each of the positive electrode collectors is electrically connected along the first side thereof to the positive terminal electrode inside the battery enclosure, and each of the negative electrode collectors is electrically connected along the second side thereof to the negative terminal electrode inside the battery enclosure, wherein the protruding portions are subjected to twist deformation around center axes of directions in which the terminal electrodes protrude.

* * * * *